United States Patent [19]

Stuessy

[11] Patent Number: 4,817,214
[45] Date of Patent: Apr. 4, 1989

[54] POOL CLEANING CHLORINE ENVELOPE

[76] Inventor: Rex E. Stuessy, 5355 N. Camino De Cumbre, Tucson, Ariz. 85715

[21] Appl. No.: 87,293

[22] Filed: Aug. 20, 1987

[51] Int. Cl.$^4$ .............................................. E03D 9/02
[52] U.S. Cl. .......................................... 4/222; 4/228; 4/496
[58] Field of Search .................. 4/228, 496, 227, 229, 4/503, 504, 222; 206/535, 538, 540; 383/37, 38

[56] References Cited

U.S. PATENT DOCUMENTS

| D. 138,698 | 9/1944 | Salfisberg | 206/535 X |
|---|---|---|---|
| 3,677,711 | 7/1972 | Bond | 4/228 X |
| 4,218,843 | 8/1980 | Clarke, Jr. | 206/0.5 X |
| 4,416,854 | 11/1983 | Nielsen | 4/228 X |

Primary Examiner—A. D. Pellinen
Assistant Examiner—Morris Ginsburg
Attorney, Agent, or Firm—Victor Flores

[57] ABSTRACT

A chlorine tablet holder designed to hyperchlorinate a localized wall or bottom area of a swimming pool. The chlorine tablet holder comprises a flexible non-porous backing material and a flexible porous front material which are permanently attached by means of vertical and horizontal seams. The chlorine tablets are inserted into pockets formed by the seams. The chlorine tablet holder is generally rectangular in shape and is suspended from the side of the pool by means of conventional suspending mechanisms inserted into the chlorine tablet holder's hanging supports.

10 Claims, 4 Drawing Sheets

POOL CLEANING CHLORINE ENVELOPE

BACKGROUND OF THE INVENTION

The present invention relates generally to chemical holders, and in particular, to a holder of chlorine tablets used to chlorinate a swimming pool.

Most private swimming pool owners use either chlorine tablets or chlorine powder to chlorinate their pools. Probably the most convenient means to chlorinate is to place chlorine tablets in a container and allow the tablets to slowly dissolve in the water. By using the tablets in a floating container, the chlorine content throughout the pool will approximate a constant, desired level.

As with any body of substantially stagnant water, swimming pool walls and bottoms frequently serve as host surfaces for algae growth. Once the algal growth is established pool maintenance is made more difficult because normal levels of chlorination are ineffective to kill the accumulated algae.

In the past, to combat the problem of algal growth, pool owners have hyperchlorinated the pool water. The extremely high levels of chlorine resulting from hyperchlorination, however, still require the owner to vigorously scrub the surfaces to eliminate the algae and render the pool unusable for the period of hyperchlorination.

Conventional chlorine tablet holders are designed for freely floating about in the pool. Such tablet holders are represented by U.S. Pat. No. 4,473,533 to Wayne C. Davey issued Sept. 25, 1984; U.S. Pat. No. 2,950,959 to W. H. Ve Relle issued Aug. 30, 1960; U.S. Pat. No. 3,677,711 to W. D. Bond issued July 18, 1972; and U.S. Pat. No. 4,241,025 to Joel Grayson IV, Marietta and Donald P. Kahle issued Dec. 23, 1980. Other chemical holders which suspend chemicals in water for dissolution are specifically patented to sanitize and prevent sediment deposits in toilet bowls and are represented by U.S. Pat. No. 3,545,014 to Elbert Davis issued Dec. 8, 1970 and U.S. Pat. No. 2,807,807 to Roscoe H. Harper issued Oct. 1, 1957 respectively.

SUMMARY OF THE INVENTION

It is, therefore, an object of the present invention to provide an apparatus which holds chlorine tablets and is configured to be suspended from the side of a pool.

It is also an object of the present invention to provide a chlorine tablet holder capable of holding a large quantity of chlorine tablets.

It is a more particular object of the present invention to provide a chlorine tablet holder adapted to release a high concentration of chlorine to a localized area.

It is another more particular object of the present invention to provide a chlorine tablet holder which can be suspended against the side of a swimming pool to hyperchlorinate water in a localized area of algae growth.

It is still another more particular object of the present invention to provide a chlorine tablet holder for releasing high concentrations of chlorine to stem algae growth in a localized area of the swimming pool.

It is yet another more particular object of the present invention to provide a chlorine tablet holder for killing algal growth and minimize the need for excessive scrubbing of the area of algal growth.

It is further an object of the present invention to provide a chlorine tablet holder which may remain in the pool while the pool is in use and not obstruct the users.

These and other objects, features and advantages of the present invention, hereinafter disclosed, will become more apparent from the following, more detailed, description of the present invention with reference to the accompanying drawings.

DESCRIPTION OF THE PREFERRED EMBODIMENT

Figure 1:
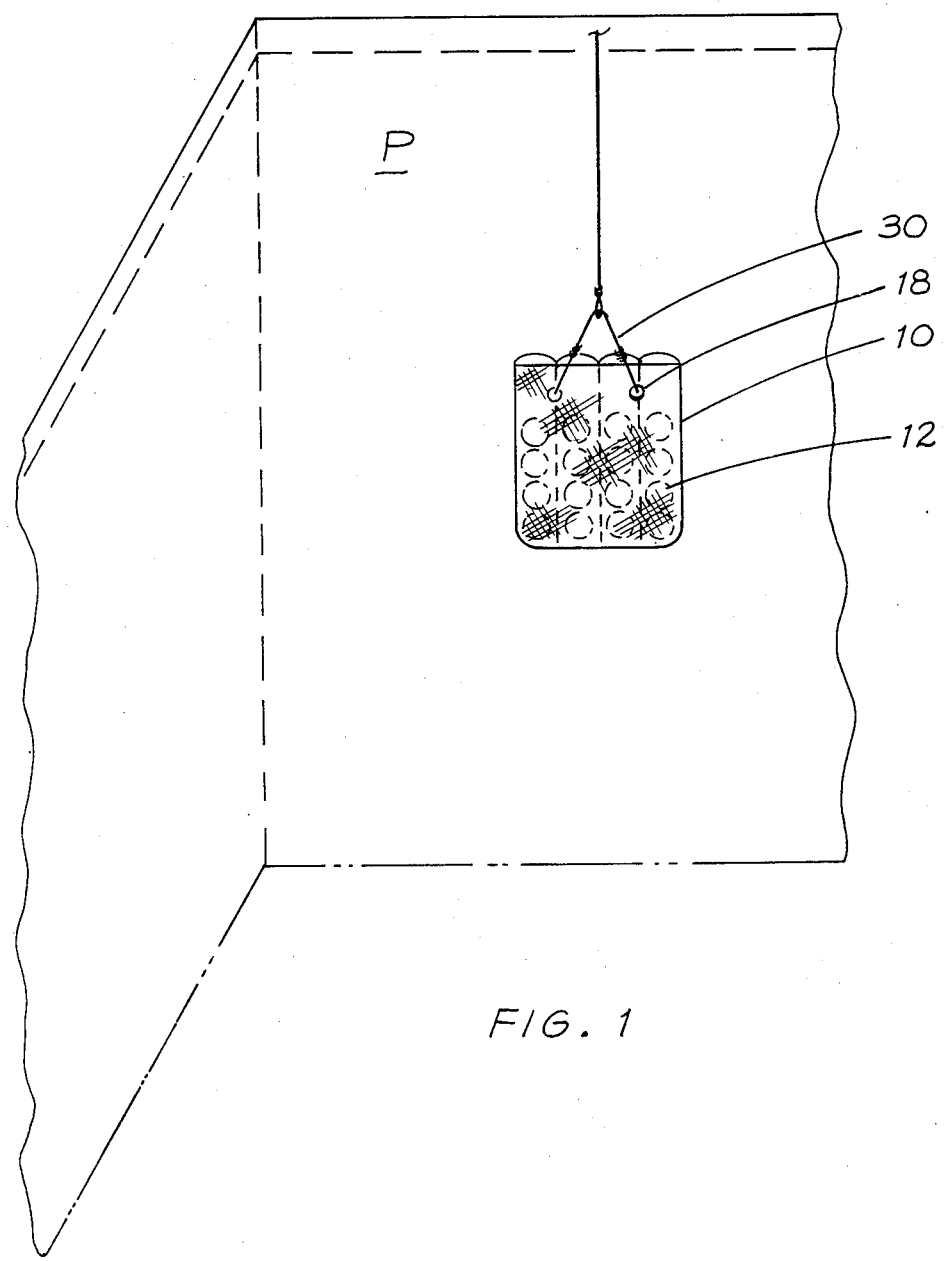
FIG. 1 is a front elevational view of the chlorine tablet holder suspended against the side of a pool.
Figure 2:
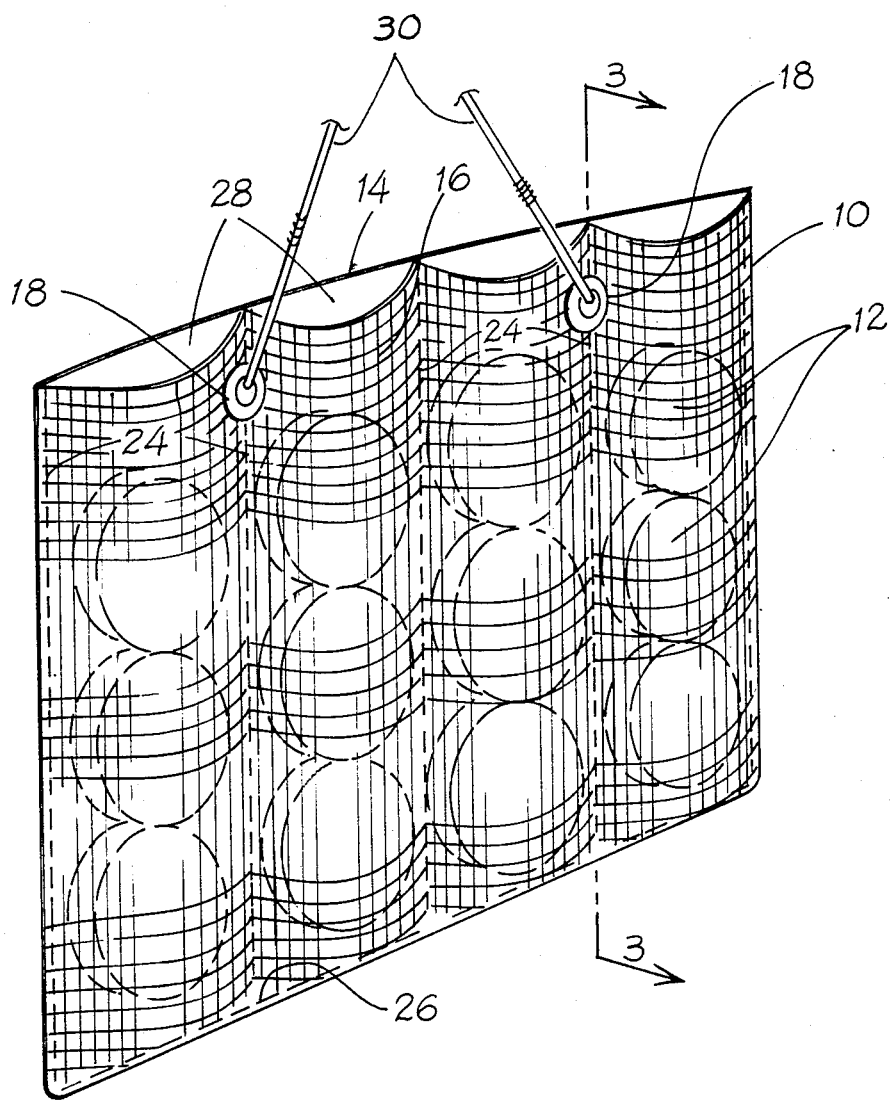
FIG. 2 is a front elevational view of the chlorine holder according to the present invention with chlorine tablets inserted therein.
Figure 3:
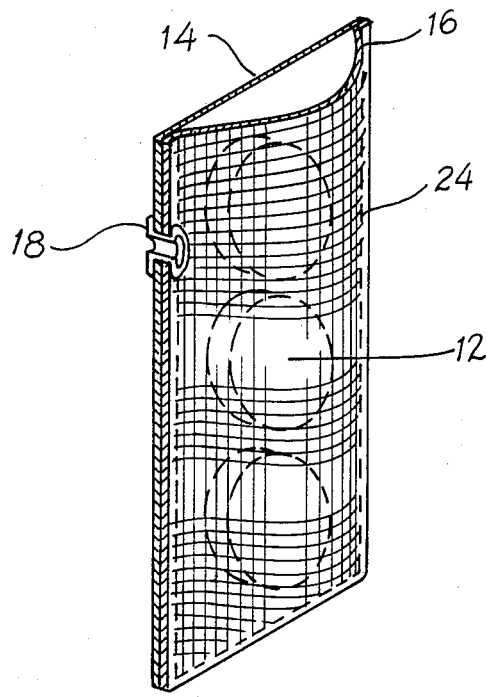
FIG. 3 is a perspective partial cross-sectional view of the tablet holder according to the present invention taken along line 3—3 of FIG. 2.
Figure 4:
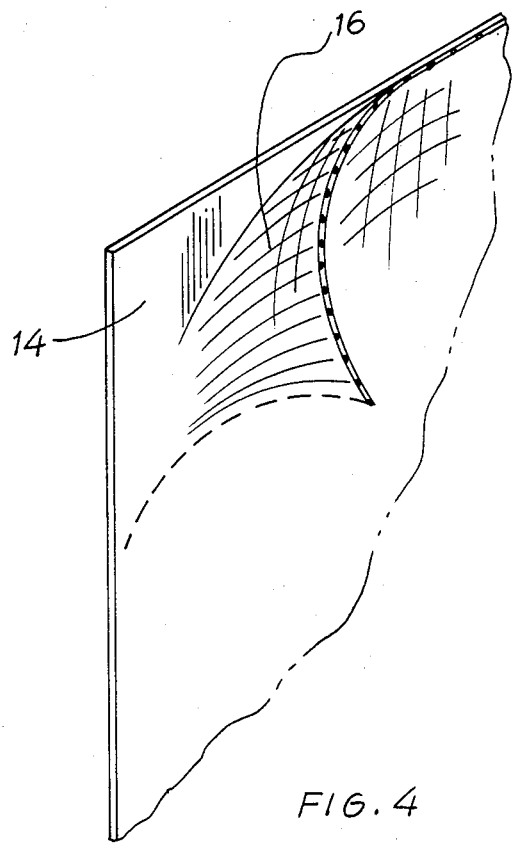
FIG. 4 is a fragmentary front elevational view of the tablet holder according to the present invention showing two layers of material.

Referring to the accompanying drawings, and in particular with reference to FIGS. 1 and 2, there is shown a chlorine tablet holder 10 with a plurality of chlorine tablets 12 inserted therein and being suspended from the side of a pool P. As best seen in FIGS. 3 and 4, the holder consists generally of a backing material 14 and a frontal material 16.

The backing material 14 is preferably constructed of a generally flexible non-porous material. The backing material 14 may be constructed from a plastic or polyvinyl material. A plurality of hanging supports 18, such as, but not limited to, grommets, are securely fastened into the backing material 14 and in the frontal material 16 thereby joining the two. The plurality of hanging supports 18 permit the chlorine tablet holder 10 to be suspended from the side of a pool without tearing backing material 14 or frontal material 16.

Figure 5:
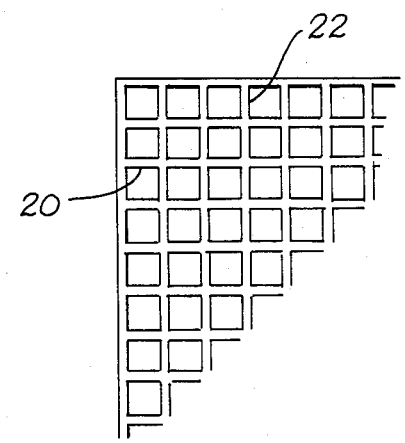
FIG. 5 is a fragmentary view of a pervious material utilized in the chlorine tablet holder according to the present invention.

The frontal material 16 is preferably constructed of a generally flexible porous material as shown in FIG. 5. The frontal material 16 consists of a plurality of horizontal members 20 and a plurality of vertical members 22 which intersect at right angles in a woven mesh configuration.

The backing material 14 and the frontal material 16 are preferably formed in a generally rectangular configuration and have similar corresponding dimensions. The sides of the backing material 14 and the frontal material 16 are generally congruent when the backing material 14 and the frontal material 16 are attached together. The frontal material 16 is permanently attached to the backing material 14 by means of a plurality of vertical seams 24, and by horizontal seam 26. The plurality of chlorine tablets 12 are inserted into a plurality of vertical pockets 28 which are formed by the vertical seams 24 and the horizontal seam 26.

The aforementioned means of attaching the backing material 14 with the frontal material 16 permits easy insertion of the chlorine tablets 12 and prevents the tablets 12 from escaping from the chlorine tablet holder 10.

The chlorine tablet holder 10 is suspended by means of a plurality of conventional suspending mechanisms 30 which are removably inserted into the plurality of hanging supports 18. The chlorine tablet holder 10 may be raised or lowered by means of the plurality of conventional suspending mechanisms 30 to allow a precise placement of the chlorine tablet holder 10 and, thereby, the chlorine tablets 12 against the side of a pool. In this manner, localized areas of hyperchlorination are achieved which are effective to kill localized algal growth. It has been found that optimum algicidal activity is achieved when pervious frontal material 16 is disposed adjacent to the pool wall or surface where algae growth is found.

It can be seen, therefore, that the present invention provides a chlorine tablet holder for use in a pool, which is easily and inexpensively constructed, easy to use and is distinct in form and function. It is apparent that there has been provided, in accordance with the present invention and the preferred embodiments thereof, a chlorine tablet holder which meets and achieves the objects and advantages set forth herein. The invention has been particularly described and illustrated with reference to certain embodiments thereof, but it is not intended that the invention be strictly limited to these embodiments. Those having ordinary skill in the art will recognize that variations and modifications differing from these embodiments, but falling within the spirit and scope of the invention, are possible. Such variations may include, but not be limited to, joining backing material 14 material and frontal material 16 with a plurality of horizontal seams forming a plurality of horizontally oriented channels, thereby permitting chlorine tablet insertion from a side of chlorine tablet holder 10. Other materials or configurations, for example, are contemplated by the present invention. All such variations and modifications as fall within the appended claims are therefore considered within the scope of the invention.

I claim:

1. A chlorine tablet holder comprising:
   a backing material;
   a frontal material, said backing material and said frontal material being permanently attached forming vertical chlorine tablet receiving pockets; and
   a plurality of hanging supports fixedly attached to said backing and frontal material for suspending and localizing said chlorine tablet holder in a swimming pool by a plurality of conventional suspending mechanisms that are removably attached to said hanging supports.

2. The chlorine tablet holder according to claim 1 wherein said backing material further comprises a flexible material formed in a rectangular configuration.

3. The chlorine tablet holder according to claim 2, wherein said flexible material further comprises being an impervious material.

4. The chlorine tablet holder according to claim 1, wherein said frontal material further comprises a flexible material formed in a rectangular configuration.

5. The chlorine tablet holder according to claim 4, wherein said flexible material further comprises a pervious material for allowing dispersion of chlorine tablets when inserted in said pockets.

6. The chlorine tablet holder according to claim 5 wherein said pervious material further comprises a plurality of vertical and horizontal members which are woven together in a mesh configuration.

7. The chlorine tablet holder according to claim 1 wherein said frontal material is permanently attached to said backing material by means of a horizontal seam disposed along a bottom perimeter of the chlorine tablet holder, a plurality of vertical side seams, each disposed along a side perimeter of the chlorine tablet holder, and a plurality of intermediate vertical seams interdisposed between said plurality of vertical side seams.

8. A chlorine tablet holder comprising:
   a backing material; and
   a frontal material, said backing material and said frontal material are permanently attached to form vertical pockets into which chlorine tablets may be inserted, said frontal material comprising a flexible pervious material formed in a rectangular configuration for allowing localized dispersion of said chlorine tablets when inserted; and
   a plurality of hanging supports fixedly attached to said backing and frontal material for suspending and localizing said chlorine tablet holder by a plurality of conventional suspending mechanisms that are removably attached to said hanging supports.

9. A chlorine tablet holder according to claim 8, wherein said backing material further comprises a flexible impervious material having a rectangular configuration.

10. The chlorine tablet holder according to claim 8, wherein said pervious material further comprises a plurality of vertical and horizontal members which are woven together in a mesh configuration.

* * * * *